May 14, 1957 T. LINDENBERG 2,792,456

VIBRATION TRANSLATING APPARATUS

Filed March 29, 1952 2 Sheets-Sheet 1

INVENTOR.
THEODORE LINDENBERG
BY
Davis, Hoxie and Faithfull
ATTORNEYS

May 14, 1957 T. LINDENBERG 2,792,456

VIBRATION TRANSLATING APPARATUS

Filed March 29, 1952 2 Sheets-Sheet 2

INVENTOR.
THEODORE LINDENBERG
BY
Davis, Hoxie and Faithfull
ATTORNEYS

United States Patent Office
2,792,456
Patented May 14, 1957

2,792,456

VIBRATION TRANSLATING APPARATUS

Theodore Lindenberg, Manhasset, N. Y.

Application March 29, 1952, Serial No. 279,357
8 Claims. (Cl. 179—100.41)

This invention relates to an improved vibration translating apparatus and in particular to an improved device of the type known in the art as a pickup mechanism. These devices are equipped with a needle or stylus suitably supported and adopted for engaging the sound modulated grooves of a phonograph record; the mechanical oscillations of the record engaging element cause an alternating current to be induced in a coil, the induced current being then amplified and converted by suitable means into audible sounds.

It is well known in the art of sound reproduction that the elasticity of the groove walls of a phonographic record will create a resonance with the mass of the pickup record engaging element or stylus; this resonant point usually occurs at a fairly high frequency. The present day trend toward a smaller groove, such as that used with long playing records, and the smaller spherical stylus used to play this groove, together with the utilization of record materials having a lower modulus of elasticity, have all contributed to a lowering of the first resonant frequency between stylus and groove. This lowering of resonance is explained by the fact that there is a smaller area of support in the groove because of the much smaller spherical stylus tip (tip radius .001 inch instead of .0025 inch) which results in a greater instantaneous "penetration" or "deflection" of the groove sidewalls at the points of contact. The softer and much more resilient material now used for records also results in greater instantaneous penetration or deflection of the groove sidewalls. The cumulative effect of all these factors has been to lower the resonant frequency to within the audible spectrum, and this is so with even the best present day commercial pickup designs.

The deleterious results to records and styli of permitting this resonant frequency to fall within the audible range are myriad. The prior art has proposed that this resonance be mechanically dampened with some viscous material, in order to flatten the frequency response curve of the system, and improve the transient response up to the frequency of resonance. However, this has not proved to be a completely satisfactory solution. The impedance of the record engaging element or stylus at and near the frequency of resonance is such that the stylus will either be forcibly thrown out of contact with the groove walls or will permanently distort and damage these walls or both. Prolonged reproduction of frequencies near resonance and above is impossible because of the rapid record wear which effectively "erases" these frequencies from the record; the concomitant granulation or breaking down of the groove walls introduces an intermittent scratchy sound known in the art as modulation noise. Lastly, the extreme pressures created when reproducing frequencies near and above resonance, cause the pickup stylus to wear rapidly. (Even relatively hard stylus materials such as sapphire show serious wear after playing a relatively small number of records of the microgroove or long playing type).

I have invented an improved vibration translating apparatus which completely obviates these difficulties, record and stylus life being thereby greatly extended, together with improved clarity and accuracy of reproduction of recorded material.

In accordance with my invention a vibration translating apparatus is disclosed in which a foundation supporting head is affixed to a rotating arm. A source of magnetism is provided, the source defining an air gap and producing a magnetic flux therefor; in the field of the magnetic flux a generating element is positioned, said element comprising a form, a coil of conducting wire, and a stylus for engaging the sound modulated grooves of a phonographic record. The stylus and coil are mounted on the form and are adapted for unitary mechanical oscillation in the magnetic field. A flexible vane having a longitudinal axis is secured to the form and to the foundation support, a pair of resilient bridging members being interposed between the support and the form so that displacement of the stylus in a plane perpendicular to the record is controlled in relation to its lateral displacement. Lateral adjusting means are also provided for accurately centering the generating element in the air gap.

A better understanding of my invention may be had from the following detailed description taken in connection with the accompanying drawing, in which.

Figure 1:
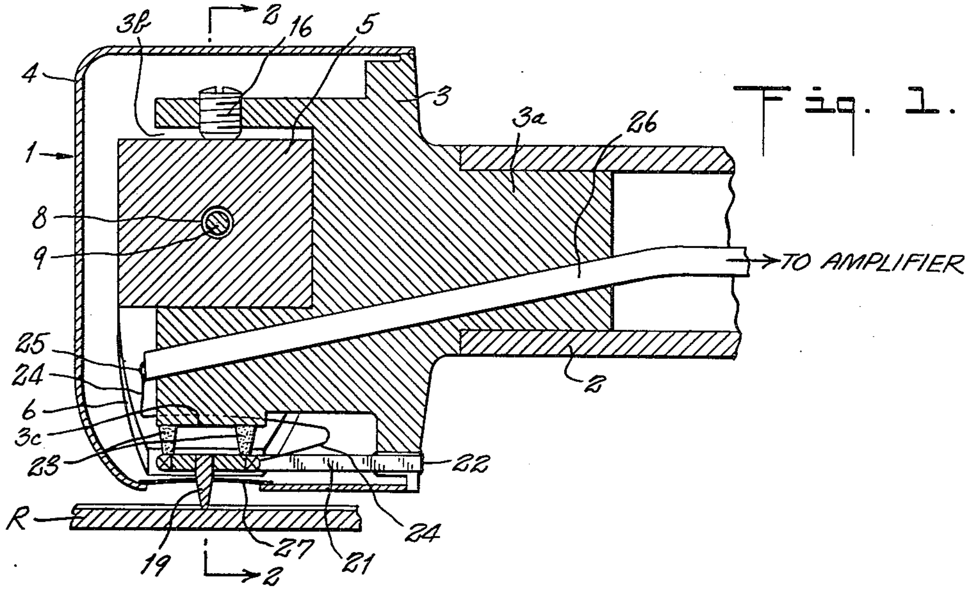
Fig. 1 is a vertical longitudinal sectional view taken through the vibration translating apparatus in accordance with my invention.

Referring now to Figs. 1–5 of the accompanying drawings, a pickup mechanism, indicated generally at 1, is mounted on the outer end of a rotating tubular tone arm 2. The pickup mechanism is supported on a non-magnetic foundation head or support 3, the head having a cylindrical tongue portion *3a*, a recessed portion *3b* and a flat bottom *3c*. In order to protect the working parts of the pickup, a thin sheet metal protective case 4 is mounted on the outer peripheral portions of the head, the case having a suitable aperture at the bottom to provide a clearance for the stylus or record engaging element 19.

The tongue portion *3a* of the head engages the inner circumference of the tubular arm 2, and is removably secured to it by any suitable means. The recess *3b* is adopted for receiving a permanent bar magnet 5, the magnet 5 resting on the bottom of the recess. Two pole pieces 6 and 7 having polarities indicated on the drawing are affixed to the ends of permanent magnet 5 by any appropriate means. In the embodiment here illustrated, a hole 8 is bored longitudinally of the magnet, the bore having a suitable diameter to receive a pin 9 with a tight fit. At one end pin 9 is provided with a countersunk head 10. Pole pieces 6 and 7 are each provided with a bore of the same diameter, piece 7 having a complementary recessed portion for receiving the head 10. When in position pin 9 is permanently secured to pole piece 7 in the region of the countersunk head.

Figures 2, 3:
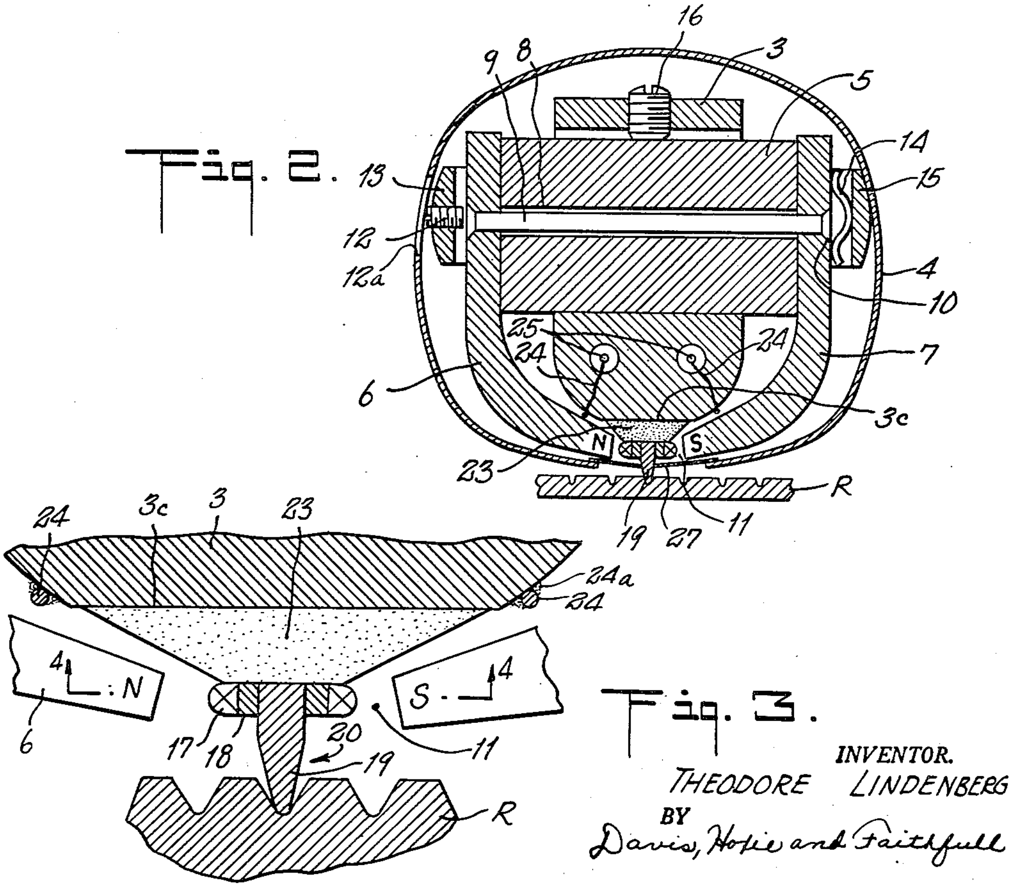
Fig. 2 is a view taken along the line 2—2 of Fig. 1.
Fig. 3 is an enlarged, partial sectional view of the generating element of the device.
Figures 4, 5:
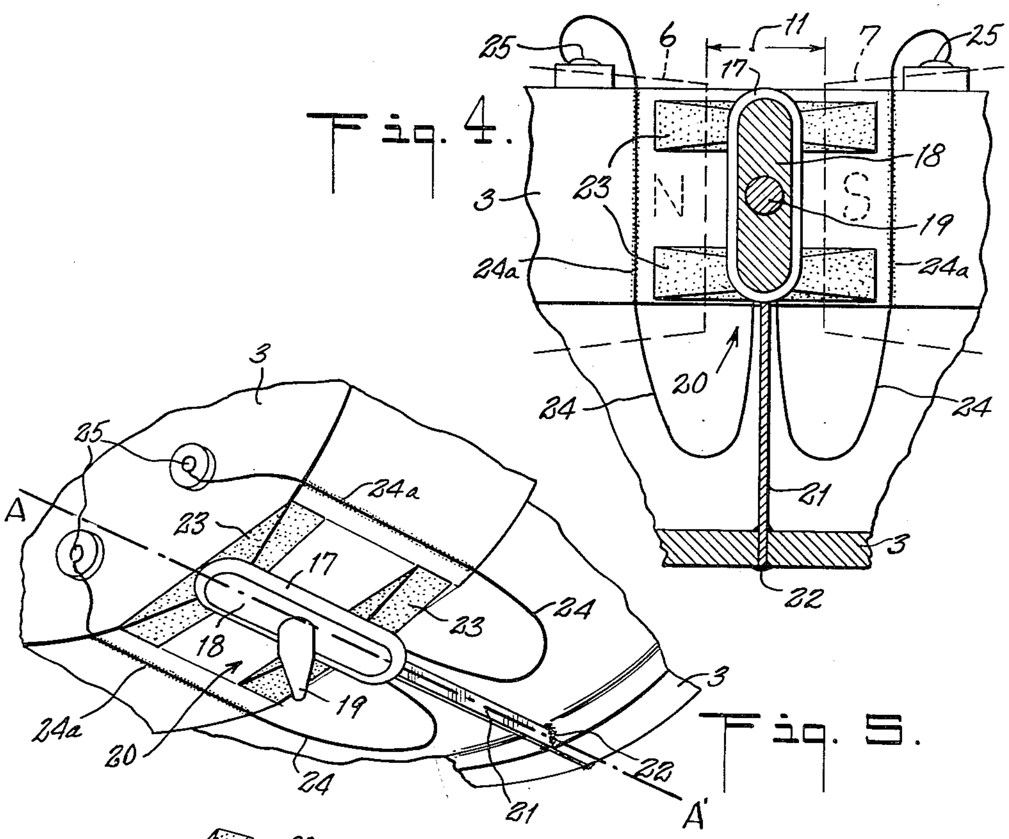
Fig. 4 is a view taken along the line 4—4 of Fig. 3.
Fig. 5 is a perspective view of the vibration translation apparatus as viewed from below, the protective metal case being removed.

As best seen in Figs. 2, 3 and 4, the pole pieces have arcuate portions bent so as to define an air gap at 11 in the proximity of the flat bottom face *3c*. Lateral adjustment means are provided for positioning the magnet-pole piece assembly in relation to the generating element 20 of the pickup. In Fig. 2 the lateral adjustment means comprises a set screw 12, plug member 13, spring means 14 and supporting pad 15. A suitable aperture 12a is provided in case 4 to permit the insertion of a screw driver. An additional set screw 16 is provided in the foundation head or support 3 to lock the magnet-pole piece assembly in position once the generating element 20 has been properly centered in the magnetic field.

The generating element, shown generally at 20, comprises a coil of fine insulated wire 17 wound upon a form 18, and a stylus or record engaging element 19. The form may be of some light plastic material such as Lucite or alternately it may be of magnetic material such as one of the annealed iron alloys. The stylus is of the sapphire or diamond type, and is secured to the center of the coil form 18.

The generating element assembly is held in rigid alignment along its pivotal axis A—A' by an elongated member such as the flexible vane 21. The vane 21 is firmly anchored at one end to the rear of the foundation head at 22, the other end of the vane being secured to the back of coil form 18. In the device illustrated in Figs. 1–5, the flexible vane 21 is mounted so as to be in a plane vertical to the record R. This will be best seen by reference to Fig. 4.

Figure 6:
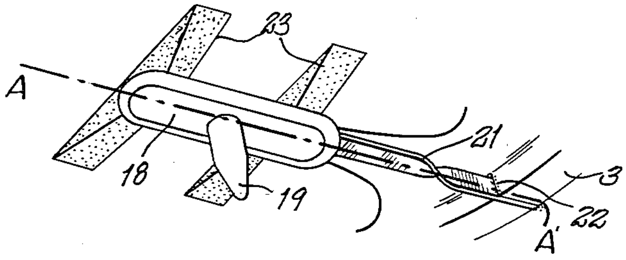
Figs. 6 and 7 are partial views in perspective, showing alternate ways for mounting the flexible vane in accordance with my invention.
Figure 7:
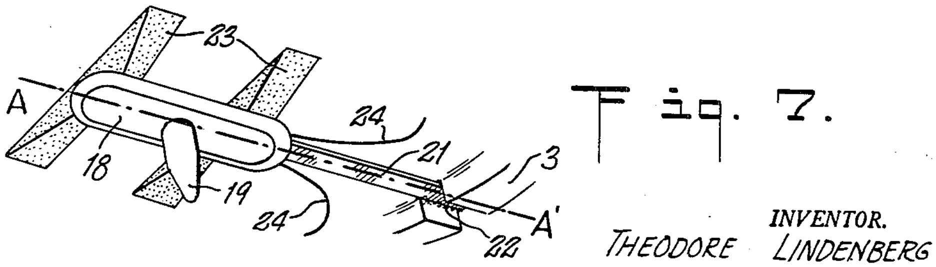

In Figs. 6 and 7 I have shown two additional ways for mounting the flexible vane. In Fig. 6 one end of the vane is twisted through an angle of 90°, so that one portion of the vane is parallel to the record R, while the other portion is in a plane vertical to the record R. In Fig. 7 the vane is mounted so that it lies in a plane parallel to record R.

The vane may be of any suitable preferably non-resonating material. In the embodiment here illustrated the vane is of a plastic material so chosen as to give the proper oscillatory compliance about axis A—A' as will shortly be made clear. In practice, the generating element and the vane 21 are impregnated with and held together by a plastic coating or cement, such as one of the nitro-cellulose lacquers. This coating serves to protect the coil 17 against external magnetic particles and to hold these small parts in rigid alignment with each other.

Vertical and lateral support for the generating element is provided by a pair of resilient block bridging members 23. The coil form assembly 17—18 is secured to the block members 23, members 23 being in turn fastened to the flat bottom face 3c of the foundation head 3. In one practical embodiment, block members 23 were made of foam neoprene, and a neoprene or rubber cement was used to secure the coil form assembly to the block members, and the latter members to the foundation head 3. In the embodiment here illustrated, bridging members 23 are in the form of a frustum of a wedge so as to give clearance for the pole pieces 6 and 7. As is best shown in Fig. 1, the bridging members 23 are also trapezoidal in cross section.

A pair of leads 24 are brought out from coil 17 to a pair of terminals 25 positioned on the front of the foundation head or support 3. A pair of solid insulated wires 26 are then lead from terminals 25, through head support 3 and the tubular arm to amplifying and reproducing means not shown on the drawing. It is desirable to cement leads 24 firmly to the foundation head 3 along the area under the pole pieces (as shown at 24a); otherwise, vibration in this area may tend to generate spurious output voltages. In order to protect the generating element from dirt or other foreign matter, a thin flexible membrane or gland 27 is secured to the case 4; as will be seen in Figs. 1 and 2, gland 27 closes the small aperture around the stylus 19.

In operation of the pickup, the stylus is positioned in the sound track of a standard laterally modulated phonograph record R (Figs. 1, 2 and 4). As the record revolves on the turntable, the lateral displacements of the stylus 19 cause the resilient block members 23 to "torque" so that the coil 17 rotates approximately about the axis A—A'. Since the coil 17 is disposed in a strong magnetic field (because of pole pieces 6 and 7) the oscillatory motion causes an alternating current to be generated in the coil 17; this A. C. current output of the pickup is then amplified and translated into audible sounds as by means of a loudspeaker.

If the generating element assembly 20 is accurately centered laterally within the gap 11 of the magnetic field, then the vertical motion of the stylus due to the "pinch effect" of the record groove will merely compress the resilient block members 23 and therefore little, if any, signal will be generated in coil 17. In accordance with my invention, the generating element is centered in the magnetic field by movement of the lateral adjustment means. This is accomplished by rotating set screw 12 to laterally position the magnet pole piece assembly (5, 6, 7) against the pressure of spring means 14. A convenient and accurate way to make this adjustment is to play the stylus 19 on a vertically modulated (sometimes called hill and dale recording) phonograph record upon which is recorded a single frequency—say, 3,000 cycles per second. While the record is playing, set screw 12 is adjusted laterally until substantially no output is obtained from the pickup; when this is accomplished the magnet pole piece assembly is locked in place by means of the additional set screw 16.

A certain small and desirable amount of vertical motion of the stylus 19 is made possible by the compliant nature of the resilient block members 23, and the flexible vane 21, yet little, if any, output voltage will be generated from these vertical displacements.

Dimensions of the moving parts used in a typical illustrative embodiment of the pickup are as follows:

Stylus (19)—.018 diameter x .060 long
Coil form (18)—.120 long x .030 wide x 0.10 thick
Vane (21)—.200 long x .015 wide x .004 thick
Coil (17)—25 to 30 turns of .001 diameter wire wound on form (18) impregnated in and coated with cement.
(All dimensions are in inches.)

A source of trouble to prior art designs has been the so-called "pinch effect" on the stylus. The pinch effect results from a change in the included angle of the record sound groove during modulation; this is due to the fact that the record grooves are cut with a sharp flat blade stylus which makes it necessary for the spherical playback stylus to ride vertically up and down in the groove as this angle varies. In accordance with my invention, a ratio of about 4:1 is obtained between lateral and vertical compliances so that the stylus is permitted to rise and fall instantaneously as a result of this pinching, while at the same time no sacrifice is made in the clarity and accuracy of reproduction of the recorded intelligence.

Some appreciation of the improved performance made possible by my invention, may be had from the fact that the pickup will not only respond to the entire band of audible frequencies, but it will have its first resonance (between its own mass and the record groove wall), at least one octave above the highest audible frequency required for full frequency range reproduction of recorded sound (up to 15,000 cycles per second). The first resonance of the pickup is 30,000 cycles per second or above when used with present day record materials such as unfilled vinylite and the cellulose nitrate lacquers used for instantaneous recordings.

Various other modifications may be made in my invention without departing from the spirit and scope thereof. The only limitations which are intended are those necessitated by the prior art or expressly indicated in the accompanying claims.

I claim:

1. In a transducer, a magnetic circuit having an air gap with a unidirectional magnetic flux thereacross, a generating element including an electrical coil located in said air gap and having a record engaging member for pivotally moving the coil in response to lateral variations in the groove of a record, a resilient member disposed respectively at either end of said coil for positioning the generating element with respect to the magnetic circuit, the resilient members presenting a compressive reaction to the vertical movement of the record engaging member and a torsional shearing reaction to the lateral pivotal movement of the record engaging member about a horizontal axis normal to the direction of the lines of flux in the air gap so that the lateral compliance of the record engaging member is several times its compliance in a vertical direction, and an elongated member of non-resonating material disposed along the pivotal axis of the moving element to preclude horizontal movement of the element relatively to the magnetic circuit in a direction normal to the direction of the magnetic lines of flux in the air gap.

2. In a transducer, a magnetic circuit having an air gap with a unidirectional magnetic flux thereacross, a generating element including an electrical coil located in said air gap and having a record engaging member for pivotally moving the coil in response to lateral variations in the groove of a record, a block of elastomer material disposed respectively at either end of said coil for positioning the generating element with respect to the magnetic circuit, the length of the respective blocks in a direction parallel to the lines of flux across the air gap being materially greater than the width and height thereof to present a compressive reaction to the vertical movement of the record engaging member and a torsional shearing reaction to the lateral pivotal movement of the record engaging member about a horizontal axis normal to the direction of the lines of flux in the air gap so that the lateral compliance of the record engaging member is several times its compliance in a vertical direction, and an elongated member of non-resonating material disposed along the pivotal axis of the moving element to preclude horizontal movement of the element relatively to the magnetic circuit in a direction normal to the direction of the magnetic lines of flux in the air gap.

3. A transducer comprising a supporting head, a magnetic circuit having an air gap carried by the head, means for producing a unidirectional magnetic flux in the core and across the air gap, a generating element including an electrical coil centrally disposed in the air gap and having a stylus for engaging the groove of a phonograph record pivotally to move the element about an axis normal to the direction of lines of magnetic flux, supporting means for the generating element including two spaced resilient block members of an elastomer material interposed between the ends of the element and the head, the length of the resilient members in a lateral direction normal to the magnetic lines of flux being at least several times as great as the width thereof whereby the compressive reaction presented to vertical movement of the generating element is several times the torsion shearing reaction presented to the lateral rotation of the generating element, and restraining means directly connected with the generating element for holding the generating element in a direction parallel to the axis of rotation thereof.

4. A transducer according to claim 3 wherein the cross section of the resilient members in a vertical plane normal to the direction of the lines of flux in the air gap is trapezoidal so that the distortion of the members resulting from the pivotal action of the generating element takes place principally in the lower portions thereof to reduce to a minimum the moving mass.

5. A transducer according to claim 3 wherein adjusting means is provided to bring the magnetic center of the air gap into coincidence with the electrical center of the generating element to minimize the voltage generated in the coil by vertical movement of the stylus.

6. A transducer according to claim 5 wherein the adjusting means moves the entire magnetic circuit including the air gap relatively to the head and generating element in a direction parallel to the lines of flux in the air gap.

7. A transducer comprising a supporting head, a magnetic circuit having an air gap carried by the head, means for producing a unidirectional magnetic flux in the core and across the air gap, a generating element including an electrical coil centrally disposed in the air gap and having a stylus for engaging the groove of a phonograph record pivotally to move the element about an axis normal to the direction of lines of magnetic flux, supporting means for the generating element including two spaced resilient block members of an elastomer material interposed between the ends of the element and the head, the length of the resilient members in a lateral direction normal to the magnetic lines of flux being at least several times as great as the width thereof whereby the compressive reaction presented to a vertical movement of the generating element is several times the torsion shearing reaction presented to the lateral rotation of the generating element, and an elongated member extending between the supporting head and the generating element along the axis of rotation thereof for restraining the element in a direction parallel to said axis.

8. A transducer according to claim 7 wherein the elongated member is of a non-resonant material.

References Cited in the file of this patent

UNITED STATES PATENTS

| | | |
|---|---|---|
| Re. 23,327 | Baker | Jan. 16, 1951 |
| 2,148,796 | Barbieri | Feb. 28, 1939 |
| 2,290,057 | Lindenberg | July 14, 1942 |
| 2,485,432 | Cornwell | Oct. 18, 1949 |
| 2,511,663 | Bachman | June 13, 1950 |
| 2,593,633 | Umpleby | Apr. 22, 1952 |